Jan. 6, 1953 J. N. JUDD 2,624,252
COMBINED CAMERA AND MICROSCOPE STAND
Filed Aug. 12, 1948 4 Sheets-Sheet 1
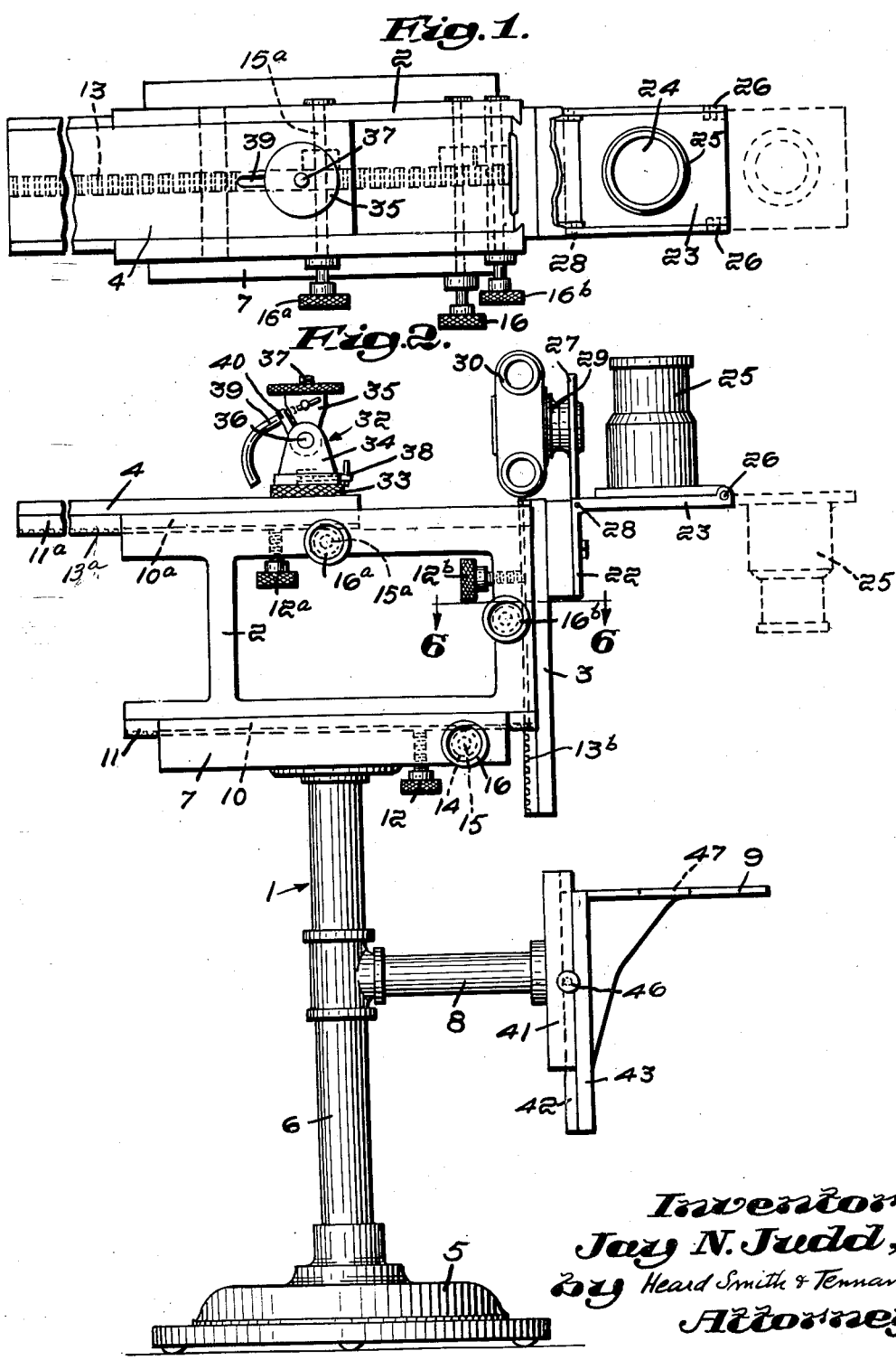
Inventor:
Jay N. Judd,
by Heard Smith & Tennant
Attorneys Jan. 6, 1953   J. N. JUDD   2,624,252
COMBINED CAMERA AND MICROSCOPE STAND
Filed Aug. 12, 1948   4 Sheets-Sheet 2

Inventor:
Jay N. Judd,
by Heard Smith & Tennant
Attorneys

Jan. 6, 1953   J. N. JUDD   2,624,252
COMBINED CAMERA AND MICROSCOPE STAND
Filed Aug. 12, 1948   4 Sheets-Sheet 4

INVENTOR
JAY N. JUDD
BY Heard Smith & Tennant
ATTORNEYS

Patented Jan. 6, 1953

2,624,252

UNITED STATES PATENT OFFICE 2,624,252

COMBINED CAMERA AND MICROSCOPE STAND

Jay N. Judd, Cambridge, Mass.

Application August 12, 1948, Serial No. 43,791

1 Claim. (Cl. 95—86)

This invention relates to a combined camera and microscope stand.

One of the general objects of the invention is to provide a camera stand that will meet the needs of every camera enthusiast, professional or amateur.

Another object of the invention is to provide a camera stand by which the camera can be supported in a wide variety of different positions thereby enabling the camera to be used for a wide variety of purposes.

A further object is to provide a camera stand which enables the operator to use any kind of lens for any type of photography such as close-up work, copying, photo-micrography, clinical work, surgical work, X-ray work, table-top work, micro-copying, etc.

A further object of the invention is to provide a stand by which both a camera and a magnifying element such as a microscope can be used conjointly so that the camera may take a picture of the object as it is enlarged by the magnifying element.

A further object is to provide a stand of the above type which is so constructed that the camera or the magnifying element can be positioned a considerable distance at one side of the supporting pedestal and then directed either horizontally or downwardly. This provision of the invention is especially valuable in hospital work, because with the camera stand placed beside a bed the camera and the magnifying element, if one is used, can be positioned over the bed in position to take a photograph of some portion of the patient.

Other objects of the invention will be apparent from the following description of one embodiment of my invention. Referring now to the drawings, Fig. 1 is a plan view of a combined camera and microscope stand embodying my invention with the eye piece shown in its inoperative position.

Fig. 2 is a side view of Fig. 1 showing the eye piece in operative position and the camera in inoperative position.

Figure 3:
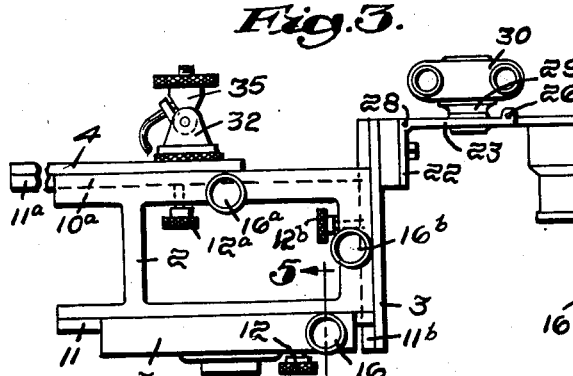
Fig. 3 is a side view showing the eye piece in an inoperative position and the camera in an operative position.
Figure 5:
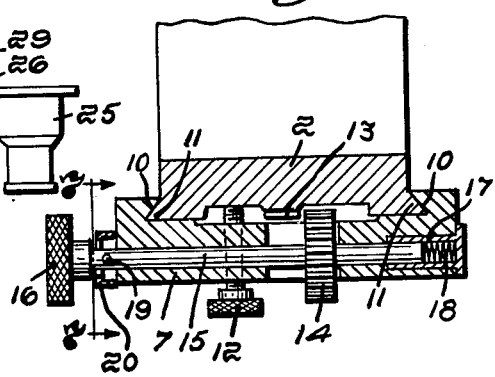
Fig. 5 is an enlarged section on the line 5—5, Fig. 3.
Figure 6:
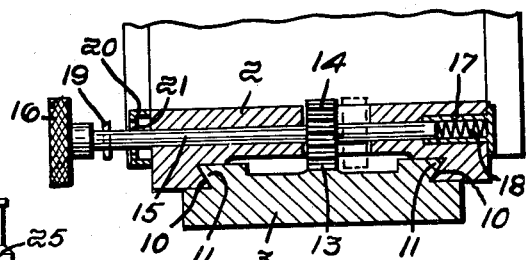
Fig. 6 is an enlarged section on the line 6—6, Fig. 2.

In the construction shown in Figs. 1 to 4, the improved stand comprises a pedestal or supporting element 1, a head 2 mounted on the pedestal for horizontal movement and two slides 3 and 4 carried by said head 2. The slide 3 is mounted for vertical adjustment and the slide 4 is mounted for horizontal adjustment.

Both the slides 3 and 4 are provided with means for supporting either a camera or a magnifying element or both.

The supporting pedestal 1 may have any suitable or usual construction. It is herein illustrated as comprising a base 5 from which rises a supporting post 6, said post having at its upper end a platform element 7 on which the head 2 is adjustably mounted. The post 6 is also provided with a laterally extending arm 8 adapted to carry a table 9 on which articles may be placed for examination through the magnifying element to be hereinafter referred to, or to be photographed by the camera.

The platform 7 is provided in its top surface with horizontal, dove-tail ways 10 in which is received the correspondingly shaped edge portions 11 of the head 2, said head thus being adjustable in the ways 10 in a horizontal direction. The platform 7 is provided with a clamping screw 12 by which said head can be clamped in any adjusted position.

The under side of the head 2 is provided with a rack 13 extending parallel to the ways 10, the teeth of which are adapted to engage a pinion 14 on a shaft 15 that is mounted on the platform 7 and extends transversely to the rack, said shaft having a knurled head 16 by which it may be turned. The shaft 15 is so mounted that it can be moved in the direction of its length thereby to bring the pinion 14 into and out of mesh with the teeth of the rack 13. When the pinion 14 is out of mesh with the rack teeth 13, the head can be freely adjusted longitudinally in the ways 10 into approximately any desired position. For fine adjustment of the head, the pinion 14 is brought into mesh with the rack teeth 13 and such fine adjustment of the head can then be secured by rotating the shaft by means of its knurled head 16.

One end of the shaft is mounted in a bearing member 17 which is provided with a spring 18 that acts against the end of the shaft 15, said spring normally tending to hold the pinion 14 into mesh with the rack 13.

When a quick adjustment of the head is desired, the operator pushes the shaft 15 inwardly against the action of the spring to disconnect the pinion 14 from the rack 13, and after the head has been placed approximately in the correct position, the shaft 15 is released to allow the pinion 14 to come into engagement with the rack 13 and thereafter the fine adjustment of said head may be made by turning the shaft.

Means are provided whereby the shaft 15 may be held in its inoperative position. For this purpose said shaft is provided with a transverse pin 19, and the platform 7 has secured thereto a cup-shaped locking element 20 provided with an opening through which the shaft 15 projects and also provided with two radial slots 21 of a size and length to permit the pin 19 to pass therethrough.

When the shaft 15 is shifted laterally so as to carry the pin 19 through the slots 21, the pinion 14 will be disengaged from the rack 13 and then by turning the shaft slightly to disaline the pin 19 with the slots 21, said shaft will be locked in is inoperative position.

A similar construction is provided for guiding and adjusting each of the slides 3 and 4 relative to the head 2. For instance the top surface of the head element 2 is provided with horizontal dovetail ways 10a similar to those formed in the platform and which are also parallel to said platform ways. These ways 10a of the head element receive the correspondingly shaped edge portions 11a of the slide 4 and said slide 4 has on its under side a rack 13a similar to the rack 13 which is adapted to be engaged by a pinion 14 on a transversely extending shaft 15a which has a knurled head 16a by which it can be turned, all as described with reference to the head element.

The vertical slide 3 also has edge portions 11b which fit in vertical dovetail ways formed on the end of the head element and has a rack 13b adapted to be actuated by a pinion carried by a shaft 15b mounted in the head 2 and operated by a knurled head 16b in the same manner as described with reference to the head 2 and slide 4.

Figure 8:
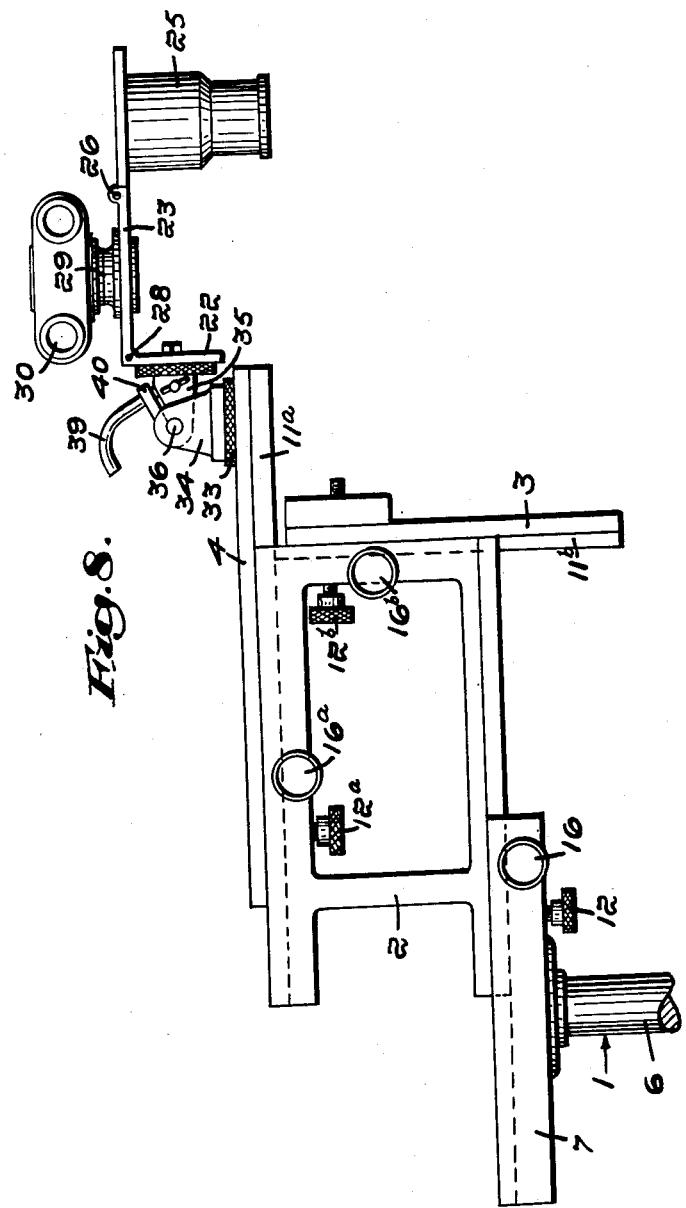
Fig. 8 is a view illustrating the camera as it might be adjusted for surgical or clinical work.

The ways on the platform 7 and also on the top surface of the head are open at their ends. With this construction the head 2 may be adjusted from a position directly over the platform into a projecting or overhanging position such as shown in Fig. 8, in which a major portion, that is, more than one half, of the head projects beyond the platform.

Similarly the slide 4 can be adjusted from a position directly over the head element 2 into a projected position in which said slide projects beyond the head element by a distance equal to at least one half of the length of the slide.

When the head element and the slide are thus adjusted into their projected positions, they form a cantilever supporting element on which a camera can be mounted and thereby placed at a considerable distance from the axis of the main supporting pedestal 1. The advantages of this construction will be more fully hereinafter set forth.

The vertically adjustable slide 3 is shown as having a combined eye piece and camera holder mounted thereon. This comprises an angular bracket having one leg 22 secured to the slide and having another leg in the nature of a shelf member 23 extending at right angles thereto and provided with a sight opening 24.

25 indicates an eye piece which is hinged to the horizontal leg 23 as shown at 26, said eye piece being swingable between an operative position such as shown in full lines, Fig. 2 wherein it stands vertically over and is alined with the sight opening 24, and an inoperative position shown in dotted lines Fig. 2. The arm 8 is constructed to support the table 9 directly beneath and in line with the sight opening 24.

The bracket 22, 23 has a camera holding element 27 pivoted thereto at 28. Said element 27 is provided with a central opening to receive the lens tube 29 of a camera 30, any suitable means being provided for clamping the camera to the camera holder 27.

This camera holder, because of its pivoted connection with the bracket, can be swung from an inoperative position shown in Fig. 2, into an operative position shown in Fig. 3, in which latter position the camera is properly positioned to photograph any article carried by the table 9.

In using the device the object or article to be photographed is placed on the table 9 and the eye piece is swung into its operative position, and the table can be adjusted vertically properly for taking the picture. The eye piece is then swung into its inoperative position and the camera holder is swung into the operative position thereby placing the camera in a position to photograph the article on the table 9.

Figure 4:
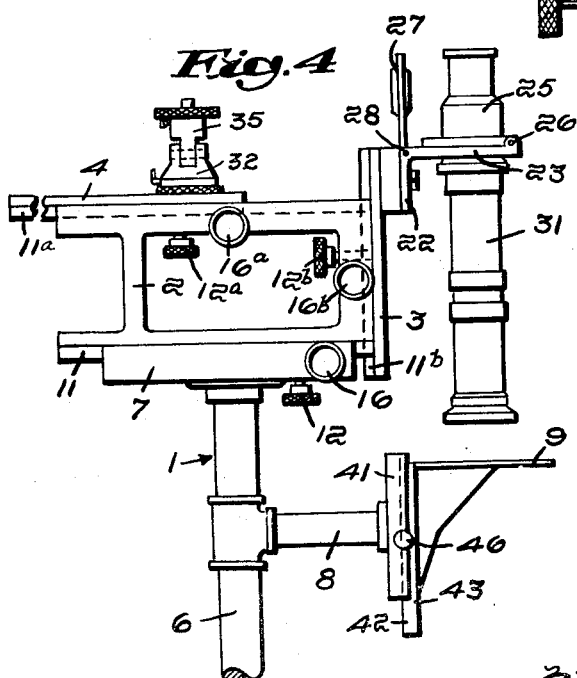
Fig. 4 is a view similar to Fig. 3 but showing the device equipped with a magnifying element.
Figure 7:
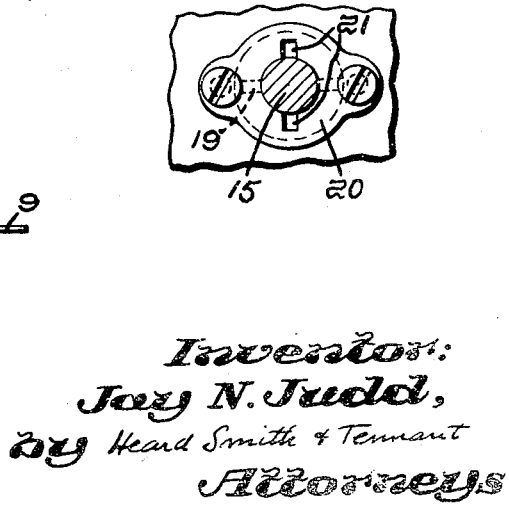
Fig. 7 is an enlarged sectional view on the line 7—7, Fig. 5.

If an enlarged photograph of a small article on the table 9 is desired, a magnifying element 31 may be secured to the shelf or leg 23 of the bracket as shown in Fig. 4. When this magnifying or microscope element is thus mounted on the bracket and the eye piece is swung into its operative position as shown in Fig. 4, any article on the table 9 will be greatly magnified as viewed through the eye piece. By this means very small minute objects can be viewed and studied by observing them through the eye piece and magnifying element 31.

If it is desired to take a magnified picture of the article on the table, then the eye piece is swung into its inoperative position and the camera is swung into its operative position with the result that the enlarged image of the minute article is photographed on the camera film.

The upper camera-supporting slide 4 is provided with an auxiliary pedestal 32 which is adapted to support either a camera or to support the bracket element 22, 23. This auxiliary pedestal 32 is provided with a base 33 secured to the slide and an intermediate portion 34 that is mounted on the base 33 for turning movement about a vertical axis.

The pedestal is also provided with the top portion 35 which is pivoted to the intermediate portion 34 as shown at 36 so that the top portion can swing about a horizontal axis into different angular positions.

The top portion 35 has a screw threaded stud 37 to which a camera may be attached or the stud may be used for clamping the bracket 22, 23 to the top part 35 of the auxiliary pedestal dependent on whether the device is to be used simply as a camera stand or as a combined camera and microscope stand.

The intermediate part 34 which is mounted to turn about a vertical axis may be clamped in any adjusted position by a clamping screw 38. The upper part 35 has a split bearing portion that encircles the pivot pin 36 and said part is locked in any adjusted angular position by clamping the two sides of the split bearing together. This is accomplished by a clamping screw 39 which extends through the arm 40 of the split bearing and screws into the body of the member 35.

The table 9 is adjustable vertically on the arm 8. Said arm is formed at its end with a supporting plate 41 provided with dove tail ways to receive a dovetail rib 42 on an arm 43 which depends from the table 9. The table is held in its adjusted position by means of a set screw 46 carried by the plate 41 and adapted to engage the rib 42.

The table 9 may be provided with an opening 47 so that if the object to be viewed or photographed is transparent, it may be lighted from beneath by any usual illuminating device not shown.

When the slide 3 is lowered so that its upper end is below the horizontal slide 4, then said horizontal slide can be adjusted forwardly to carry the auxiliary pedestal 32 a considerable distance beyond the head element 2 and by adjusting the head element 2 into its projected position as shown in Fig. 8, the camera supporting pedestal 32 will be placed at a distance considerably to one side of the axis of the supporting pedestal 1. When the head element and the slide are thus adjusted into their projected positions, they form a cantilever supporting structure for the camera. This construction which provides such cantilever supporting means for the camera is of special advantage for hospital work, because by adjusting the head and the top slide 4 as shown in Fig. 8, the auxiliary pedestal 32 may be placed at a considerable distance from the supporting pedestal 1 so that if the supporting pedestal is placed by the side of a bed, it is possible to mount a camera or a microscope element on the auxiliary pedestal 32 in a position over the patient occupying the bed and by turning the top part 35 of the pedestal into a horizontal position and attaching the bracket 22, 23 thereto, it will be possible to obtain a magnified view of some portion of the patient or to take a magnified photograph thereof.

Figure 9:
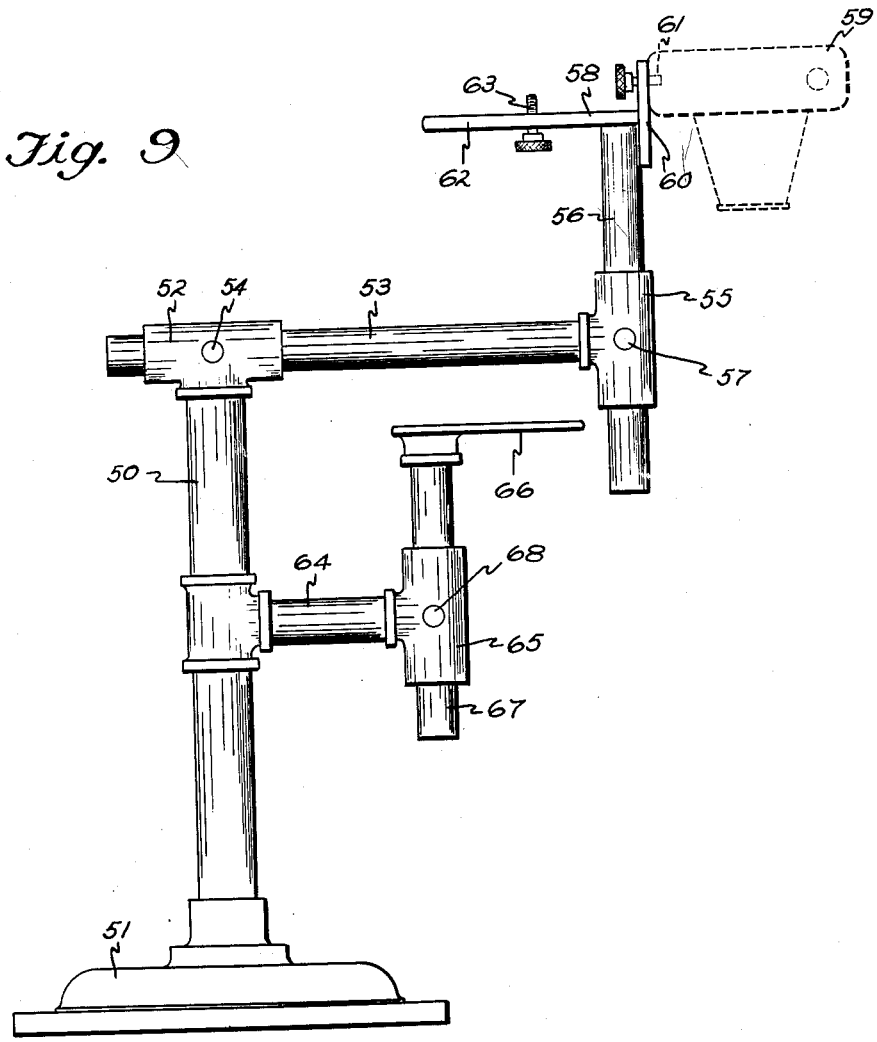
Fig. 9 is a view illustrating a camera stand embodying my invention but constructed somewhat differently from the stand shown in Figs. 1 to 8.
Figure 10:
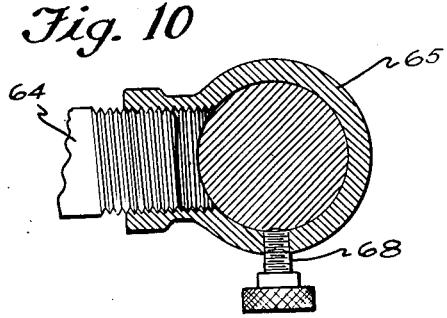
Fig. 10 is a section on the line 10—10, Fig. 9.

In Figs. 9 and 10 I have illustrated an embodiment of the invention which shows a simpler and less expensive construction than that illustrated in Figs. 1 to 8.

In the camera shown in said figures the pedestal comprises the post 50 mounted on a base 51 and carrying at its upper end a tubular head member 52 in which is slidably supported a horizontal rod or tube 53, the latter being held in adjusted position by a suitable key way and a set screw 54. The rod 53 carries at its end a tubular member 55 in which is slidably mounted a camera supporting element comprising a post or rod 56 which telescopes through the member 55 and is held in adjusted position by the set screw 57 and which also comprises a camera supporting head 58 that is constructed to support a camera such as indicated at 59 either with the lens tube directed horizontally or vertically. The camera supporting element comprises a vertically extending portion 60 which carries a screw threaded stud 61 on which the camera 59 can be mounted in a position to direct the lens tube thereof downwardly as shown by dotted lines in Fig. 9. The camera supporting element also has the horizontally extending portion 62 provided with a screw threaded stud or stem 63 on which the camera 59 can be mounted with the lens tube directed horizontally. The adjustability of the post 56 in the tubular member 55 and the adjustability of the rod 53 in the tubular member 52 provides for adjusting the camera vertically or horizontally into a wide variety of different positions in the same way that the camera could be adjusted vertically and horizontally by means of the slides 3 and 4 and the head 2 in the construction shown in Figs. 1 to 8.

The post 50 of the pedestal is also provided with a horizontally extending table-supporting arm 64 corresponding to the arm 8 in Figs. 1 to 8. The arm 64 carries at its outer end a vertically extending tubular member or sleeve 65 in which the table element 66 is mounted for vertical movement. For this purpose the table element 66 is shown as carried by a rod or tube 67 which extends through the sleeve 65 and is vertically adjustable therein and is held in adjusted position by the set screw 68.

If the camera is to be used for photographing slides or other small articles, such articles may be placed on the table 66 and the rods 53 and camera supporting member 56 may be then adjusted so as to place the camera, when supported in the position shown in the dotted lines in Fig. 9, directly over the table 66.

The tubular members or sleeves 52, 55 and 65 may all be of the same size and identical in construction. An advantage of this is that it simplifies and reduces the cost of construction for by using these identical sleeve elements and connecting them to rods or tubes such as shown at 53, 56, 64, a camera stand can be provided which will have all the utilitarian features above referred to.

I claim:

A camera stand comprising a vertically extending pedestal member surmounted by a horizontal platform having on its upper surface horizontal dovetail ways, a head element slidably mounted in said ways for bodily adjustment horizontally between a position directly over the platform and a projected overhanging position in which one end of the head element projects beyond and overhangs one end of the platform by an amount equal to at least one-half of the length of the head, said head element having in its upper surface horizontal dovetail ways parallel to those of the platform and also having rack teeth on its under surface extending parallel to said ways, an elongated camera-supporting slide adjustable horizontally in the ways of the head between a position directly above said head and a position in which one end of the slide projects beyond and overhangs one end of the head by a distance equal to at least one-half the length of the slide, a camera mounting on said end of the slide, said mounting having provision for holding a camera either in a horizontally directed position or in a position directed downwardly and at a point beyond said end of the slide while the latter remains stationary in any of its adjusted positions in a horizontal direction, whereby when both the head and the slide are in overhanging positions they form a cantilever supporting structure for the camera by which it can be supported in a downwardly directed position at a distance from the pedestal greater than the amount of the overhang of the head added to that slide, a shaft supported in the platform and extending at right angles to the rack teeth, a gear on said shaft, said shaft being movable in the direction of its length between an operative position in which the gear is in mesh with the rack teeth and an inoperative position in which said gear is out of mesh with said rack teeth, and a spring acting on said shaft and yieldingly holding it in one of its two positions.

JAY N. JUDD.

REFERENCES CITED

The following references are of record in the file of this patent:

UNITED STATES PATENTS

| Number | Name | Date |
|---|---|---|
| 947,153 | Forth | Jan. 18, 1910 |
| 1,327,474 | Howard | Jan. 6, 1920 |
| 1,795,296 | Zeng | Mar. 10, 1931 |
| 1,973,542 | Shull | Sept. 11, 1934 |
| 2,324,842 | Huebner | July 20, 1943 |